United States Patent
Schiffino et al.

(12) 
(10) Patent No.: US 6,486,278 B1
(45) Date of Patent: Nov. 26, 2002

(54) ETHYLENE COPOLYMERIZATION PROCESS

(75) Inventors: Rinaldo S. Schiffino, Wilmington, DE (US); Donna J. Crowther, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/251,819

(22) Filed: Feb. 17, 1999

Related U.S. Application Data

(60) Provisional application No. 60/074,814, filed on Feb. 17, 1998.

(51) Int. Cl.⁷ .................................................. C08F 4/42
(52) U.S. Cl. ........................ 526/160; 526/127; 526/943; 526/348; 526/335; 526/352; 502/152; 502/117
(58) Field of Search ................................. 526/127, 160, 526/943, 348, 335, 352; 502/152, 117

(56) References Cited

U.S. PATENT DOCUMENTS

| | | | |
|---|---|---|---|
| 5,240,894 A | | 8/1993 | Burkhardt et al. |
| 5,324,800 A | | 6/1994 | Welborn, Jr. et al. |
| 5,391,789 A | | 2/1995 | Rohrmann |
| 5,521,265 A | | 5/1996 | Schottenberger et al. |
| 5,541,272 A | | 7/1996 | Schmid et al. |
| 5,543,373 A | | 8/1996 | Winter et al. |
| 5,571,880 A | * | 11/1996 | Alt et al. ................. 526/160 |
| 5,733,991 A | * | 3/1998 | Rohrmann et al. ......... 526/160 |
| 5,753,578 A | * | 5/1998 | Santi et al. ................ 502/114 |
| 5,780,659 A | * | 7/1998 | Schmid et al. ............ 556/11 |

FOREIGN PATENT DOCUMENTS

| | | | |
|---|---|---|---|
| EP | 0 500 944 A1 | | 9/1992 |
| EP | 0 610 843 A1 | | 8/1994 |
| EP | 0 610 851 A1 | | 8/1994 |
| EP | 0 612 769 | * | 8/1994 |
| EP | 0 659 758 A1 | | 6/1995 |
| EP | 0 729 983 | * | 9/1996 |
| EP | 0 955 305 | * | 11/1999 |
| WO | WO95/27717 | * | 10/1995 |
| WO | WO 97/38019 | * | 10/1995 |
| WO | WO 96/33227 | | 10/1996 |
| WO | WO 97/38019 | | 10/1997 |
| WO | WO 00/68279 | * | 11/2000 |

* cited by examiner

Primary Examiner—David W. Wu
Assistant Examiner—Ling-Siu Choi
(74) Attorney, Agent, or Firm—William G. Muller; Charles E. Runyan

(57) ABSTRACT

This invention is a solution process for the preparation of ethylene-α-olefin-diolefin copolymers comprising contacting ethylene, one or more α-olefin monomer, and one or more cyclic diene monomer, with a catalyst composition comprising a bridged, bis(cyclopentadienyl) zirconium compound having an unsubstituted cyclopentadienyl ligand, a multiply substituted cyclopentadienyl ligand, said ligands bridged by a covalent bridging group containing one or more Group 14 element, and two uninegative, activation reactive ligands and a catalyst activator compound. The invention process exhibits high catalyst activity, high comonomer incorporation and high diene monomer conversion rates and is particularly suitable for the preparation of elastomeric ethylene-propylene or ethylene-propylene-diene monomer elastomers.

19 Claims, No Drawings

ETHYLENE COPOLYMERIZATION PROCESS

CROSS-REFERENCE TO RELATED APPLICATIONS

This application is related to provisional application Ser. No. 60/074,814 filed Feb. 17, 1998.

TECHNICAL FIELD

This invention relates to the preparation of ethylene-α-olefin polymers under solution polymerization conditions using catalyst compositions based on biscyclopentadienyl derivatives of zirconium.

BACKGROUND OF THE INVENTION

Polymers comprising ethylene and at least one or more α-olefin and optionally one or more diolefin make up a large segment of polyolefin polymers and will be addressed for convenience as "ethylene-α-olefin-diolefin copolymers" herein. Such polymers range from crystalline polyethylene copolymers to largely amorphous elastomers, with a new area of semi-crystalline "plastomers" in between. In particular, ethylene-α-olefin-diolefin elastomers are a well established class of industrial polymers having a variety of uses associated with their elastomeric properties, their thermo-oxidative stability, their solubility in hydrocarbon oleaginous fluids, and their capability for modifying the properties of polyolefin blends. Included in this terminology are the commercially available EPM (ethylene-propylene monomer) and EPDM (ethylene-propylene-diene monomer) rubbery polymers, both being vulcanizable by cross-linking, the addition of the diolefin, also known as diene monomer, providing increased ease of both cross-linking and functionalization.

Commercially prepared ethylene-α-olefin-diolefin elastomers have been traditionally been made via Ziegler-Natta polymerization with homogenous catalyst compositions largely based on vanadium or titanium. Newer metallocene catalyst compounds have received attention due to their ease of larger monomer incorporation and potential increases in polymerization activities. U.S. Pat. No. 5,324,800 describes metallocenes having substituted and unsubstituted cyclopentadienyl ligands which are suitable for producing high molecular weight olefin polymers, including linear, low density copolymers of ethylene with minor amounts of α-olefin. WO95/277147 describes bridged and unbridged Group 4 metallocene compounds wherein the cyclopentadienyl ligands have two or four adjacent substituents forming one or two alkylenic cycles of from 4 to 8 carbon atoms. These compounds are said to be useful for ethylene copolymerization and propylene polymerization, including elastomeric copolymers of ethylene, α-olefins and non-conjugated diolefins. Ethylene copolymerization with propylene is reported in examples 28–30 and in Table 3, U.S. Pat. No. 5,543,373 describes bridged metallocenes having two differing π ligands which are said to be of high activity. Copolymers of ethylene with 1-olefins and/or one or more diene monomers are produced in a preferred process according to the invention. Example R illustrates an ethylene-propylene-diene terpolymer rubber prepared with dimethylsilanediyl(2-methyl4-phenyl-1-indenyl)(2,3,5-trimethyl-1-cyclopentadienyl) zirconium dichloride.

Ethylene copolymerization is described in WO 95/27717 with zirconocenes having a Cp cyclopentadienyl group with one or two alkylenic cycles of 4 to 8 carbon atoms and a Cp' cyclopentadienyl group having up to 4 R substituents. Example 12 illustrates the preparation of isopropyliden (cyclopentadienyl) (2,3-cyclotetramethyleneinden-1-yl) zirconium dichloride. Example 19 illustrates syndiotactic propylene polymerization with this catalyst.

A high temperature solution process for the preparation of ethylene-α-olefin copolymers is described in EP-A-0 612 769. The catalyst compositions are based on bis (cyclopentadienyl/indenyl/fluorenyl) titanocenes/ zirconocenes which are combined with an alkyl aluminum compound and an ionizing ionic compound which provides a non-coordinating anion. Asymmetrically substituted catalysts are illustrated. The solution process conditions are described to range from 120 to 300° C. at pressures from atmospheric to 200 kg/cm$^2$. In the examples of this process the metallocene compound is reacted with the organoaluminum compound, then reacted with ionizing ionic compound, and subsequently added to the polymerization reactor. High molecular weight polymer is said to be produced at high efficiency.

A high activity supported catalyst suitable for ethylene copolymers is described in U.S. Pat. No. 5,240,894. The catalyst isopropylidene(cyclopentadienyl)(fluorenyl) zirconium dichloride is a preferred metallocene embodiment. Example 10 illustrates an ethylene-propylene copolymerization.

It remains important in industry to develop efficient copolymerization processes, and in particular, those capable of high productivity of polymer per unit weight of catalyst compound.

INVENTION DISCLOSURE

The invention is a polymerization process for the preparation of ethylene-α-olefin-diolefin copolymers comprising contacting ethylene, one or more α-olefin monomer, and optionally, one or more cyclic diolefin monomer, with a catalyst composition prepared from at least one a catalyst activator and at least one bridged, bis(cyclopentadienyl) zirconium compound having an unsubstituted cyclopentadienyl ligand, a bulky, substituted cyclopentadienyl ligand, said ligands bridged by a covalent bridging group containing one or more Group 14 element, said process conducted in a solution polymerization process. The invention process exhibits high catalyst activity, high comonomer incorporation and high diene monomer conversion rates.

BEST MODE AND EXAMPLES OF THE INVENTION

The ethylene-α-olefin-diolefin copolymers of this invention (hereinafter referred to as "EPC") is meant to include copolymers, terpolymers, tetrapolymers, etc. It typically comprises ethylene, one or more alpha-olefins, and optionally, one or more cyclic diolefin monomers; it is typically substantially amorphous, and it will typically have a substantially random arrangement of at least the ethylene and the alpha-olefin monomers. Thus both of ethylene-containing elastomer and plastomer copolymers can be prepared by the invention process.

The EPC capable of preparation in accordance with the invention process generally can have a molecular weight range typically between about 20,000 and up to about 500,000 or higher, more typically between about 60,000 and 300,000 where the molecular weight is number-average ("$M_n$").

Typically elastomeric EPC is "substantially amorphous", and when that term is used to define the EPC elastomers of this invention it is to be taken to mean having a degree of crystallinity less than about 25% as measured by means known in the art, preferably less than about 15%, and more preferably less than about 10%. The three major known methods of determining crystallinity are based on specific volume, x-ray diffraction, and infrared spectroscopy. Another well-established method, based on measurement of heat content as a function of temperature through the fusion range, is carried out using differential scanning calorimetric measurements. It is known that these independent techniques lead to reasonably good experimental agreement. The degree of randomness of the arrangement of monomers in the EPC elastomeric polymers also affects the crystallinity and is appropriately characterized by the degree of crystallinity.

Additionally, it is known in the art that the tendency of a particular combination of catalyst composition and monomers to produce blocky, random, or alternating polymers can be characterized by the product of the reactivity ratios defined for the given monomers under the specific reaction conditions encountered. If this product is equal, to 1.0, the sequence distribution will be perfectly random; the more the product is less than 1.0, the more the monomers will tend to have a "blocky" sequence distribution. Generally speaking, the segments of a polymer which crystallize are linear segments of a polymer which have a number of identical (both by chemical make-up and stereo-specific orientation) units in a row. Such segments are said to be "blocky". If there is little or no such sequential order within the segments making up a polymer chain, that chain will be very unlikely to conform itself into the correct shape to fit into the spatial order of a crystal and will accordingly exhibit a low degree of crystallinity. See, "Ethylene-Propylene Copolymers. Reactivity Ratios, Evaluation and Significance", C. Cozewith and G. Ver Strate, *Macromolecules*, Vol. 4, No. 4, 482–4899 (1971). The EPC elastomers of this invention accordingly can be characterized in one embodiment by the limitation that its method for preparation has a reactivity ratio product less than 2.0, preferably less than about 1.5, and more preferably less than about 1.25.

The EPC elastomers of the invention will contain about 10 to about 91 weight percent ethylene, preferably about 20 to 88 weight percent ethylene. The EPC elastomers of the invention preferably contain from 35 to 75 weight percent ethylene.

The α-olefins suitable for use in the preparation of the EPC, or for the polyethylene copolymers, are preferably $C_3$ to $C_{20}$ α-olefins, but will include higher carbon. number olefins such as polymerizable macromers having up to five hundred carbon atoms, or more. Illustrative non-limiting examples of such α-olefins are one or more of propylene, 1-butene, 1-pentene, 1-hexene, 1-octene, and 1-decene. Included in the term α-olefins for the purposes of describing effectively copolymerized monomers are the constrained-ring cyclic monoolefins such as cyclobutene, cyclopentene, norbornene, alkyl-substituted norbornene, alkenyl-substituted norbornene, and the higher carbon number cyclic olefins known in the art, see U.S. Pat. No. 5,635,573, incorporated herein by reference for purposes of U.S. patent practice. The α-olefin content of the EPC ranges depending upon selection of the specific α-olefin. or α-olefins, being more for lower carbon number monomers, for example, about. 10 to about 91 wt. %, preferably about 20 to about 88 wt. % for propylene; and, 5 to 35 mol. %, preferably 7.5 to 25 mol. % and most preferably 10 to 20 mol. % for 1-octene. The EPC elastomers typically have above about 25 mol. % α-olefin incorporation. For the more crystalline polyethylene copolymers the range of comonomer incorporation will typically be below 25 mol. % and more typically below about 15mol. %. In terms of polymer density, the elastomers are typically below about 0.860 g/cm³, and the plastomer ethylene copolymers are from about 0.860 to 0.915.

The diene monomers, or diolefins, useful in this invention include those typically used in known EPDM polymers. The typically used diene monomers are generally selected from the cyclic diolefins having about 6 to about 15 carbon atoms, for example:

A. single ring alicyclic dienes such as 1,3-cyclopentadiene; 1,4-cyclohexadiene; 1,5-cyclooctadiene and 1,5-cyclododecadiene;

B. multi-ring alicyclic fused and bridged ring dienes such as tetrahydroindene, methyl tetrahydroindene, dicyclopentadiene; bicyclo-(2,2,1)-hepta-2,5-diene; alkenyl, alklindene, cycloalkenyl and cycloalkylidene norbornenes such as 5-methylene-2-norbornene (MNB), 5-ethylidene-2-norbornene, 5-isopropylidene-2-norbornene, 5-(4-cyclopentenyl)-2-norbornene, 5-cyclohexylidene-2-norbornene, 5-vinyl-2-norbornene; and C. cycloalkenyl-substituted alkenes, such as allyl cyclohexene, vinyl cyclooctene, allyl cyclohexene, vinyl cyclooctene, allyl cyclodecene, vinyl cyclododecene.

Of these, the preferred dienes are dicyclopentadiene, 5-methylene-2-norbornene, 5-ethylidene-2-norbornene and 5-vinyl-2-norbornene. It will be apparent that a mix of such dienes can also be utilized. The content of the diene monomer in the EPC elastomer can be 0 to about 20 weight percent, and if used, preferably 0.5 to about 15 weight percent, and most preferably about 2.0 to about 12.0 weight percent. Surprisingly, diene incorporation greater than 5.0 wt. %, even greater than 8.0 wt. % is made possible using the process of this invention.

The bridged, bis(cyclopentadienyl) compounds of this invention typically comprise those having ancillary ligands including the unsubstituted cyclopentadienyl ligand, a multiply substituted, bulky cyclopentadienyl ligand, the cyclopentadienyl ligands covalently bridged, and two uninegative, activation reactive ligands at least one of which that can be abstracted for activation of the remaining metal compound to a catalytically active state and one of which is either similarly abstractable or has a σ-bond to the transition metal into which an olefin or diolefin can insert for coordination polymerization.

Thus the bridged, bis(cyclopentadienyl) zirconium compounds of the present invention have the following structure:

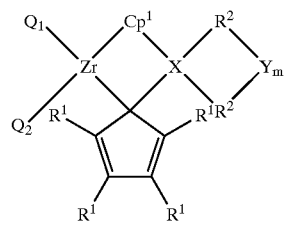

where the unsubstituted cyclopentadienyl ring is $Cp^1$, and the substituted cyclopentadienyl ring ($Cp^2R_n$) has at least two non-hydrogen radical substituents $R^1$, wherein each $R^1$ is, independently, a radical selected from:

a) hydrogen radical, b) hydrocarbyl, silyl or germyl radicals having from 1 to 20 carbon, silicon or germanium atoms, c) substituted hydrocarbyl, silyl or germyl radicals as defined, wherein one or more hydrogen atoms is replaced by a halogen radical, an amido radical, a phosphido radical, an alkoxy radical, an aryloxy radical or any other radical containing a Lewis acidic or basic functionality, d) $C_1$–$C_{20}$ hydrocarbyl-substituted metalloid radicals wherein the metalloid is selected from the group consisting of Ge, Sn and Pb, e) halogen radicals, f) amido radicals, g) phosphido radicals, h) alkoxy radicals, and i) alkylborido radicals; or at least two $R^1$ groups are joined together to form, along with the carbon atoms to which they are attached, a $C_4$–$C_{20}$ ring structure, which is saturated or partially saturated, and substituted or unsubstituted, the ring structure substitution being selected from one or more $R^1$ groups as defined under (a)–(i) above, X is selected from the group consisting of C, Si, Ge, Sn and Pb;

$R^2$ is selected from the group consisting of H, unsubstituted $C_1$–$C_{20}$ hydrocarbyl, $C_1$–$C_{20}$ hydrocarbyl substituted with at least one Si, and $C_1$–$C_{20}$ hydrocarbyl substituted with at least one Ge;

m=0 or 1,

Y is selected from the group consisting of hydrocarbyl radicals, hydrosilyl radicals, and hydrogermyl radicals; and $Q^1$ and $Q^2$ are non-cyclopentadienyl radicals wherein i) independently, each Q is selected from the group consisting of halide, hydride, unsubstituted $C_1$–$C_{20}$ hydrocarbyl, $C_1$–$C_{20}$ hydrocarbyl substituted with at least one $R^1$ group as defined under (a)–(i) above, alkoxide, aryloxide, amide, halide or phosphide; or ii) together, $Q^1$ and $Q^2$ may form an alkylidene, cyclometallated hydrocarbyl or any other divalent anionic chelating ligand.

Preferred zirconium compounds where two sets of $R^1$ groups are joined together has the following structure:

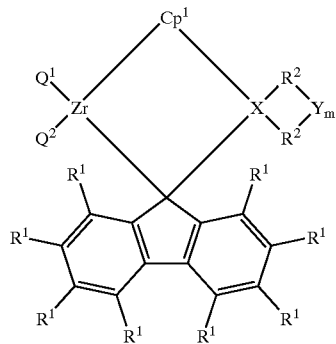

where the unsubstituted cyclopentadienyl ring is $Cp^1$, and the substituted fluorenyl ring has at least two non-hydrogen radical substituents, wherein each $R^1$ is, independently, a radical selected from:

a) hydrogen radical, b) hydrocarbyl, silyl or germyl radicals having from 1 to 20 carbon, silicon or germanium atoms, c) substituted hydrocarbyl, silyl or germyl radicals as defined, wherein one or more hydrogen atoms is replaced by a halogen radical, an amido radical, a phosphido radical, an alkoxy radical, an aryloxy radical or any other radical containing a Lewis acidic or basic functionality, d) $C_1$–$C_{20}$ hydrocarbyl-substituted metalloid radicals wherein the metalloid is selected from the group consisting of Ge, Sn and Pb, e) halogen radicals, f) amido radicals, g) phosphido radicals, h) alkoxy radicals, and i) alkylborido radicals, or at least two $R^1$ groups are joined together to form, along with the carbon atoms to which they are attached, a $C_4$–$C_{20}$ ring structure, which is saturated or partially saturated, and substituted or unsubstituted, the ring structure substitution being selected from one or more $R^1$ groups as defined under (a)–(i) above;

X is selected from the group consisting of C, Si, Ge, Sn and Pb;

$R^2$ is selected from the group consisting of H, $C_1$–$C_{20}$ hydrocarbyl, $C_1$–$C_{20}$ hydrocarbyl substituted with at least one Si, and $C_1$–$C_{20}$ hydrocarbyl substituted with at least one Ge;

m=0 or 1,

Y is selected from the group consisting of hydrocarbyl radicals, hydrosilyl radicals, and hydrogermyl radicals; and $Q^1$ and $Q^2$ are non-cyclopentadienyl radicals wherein i) independently, each Q is selected from the group consisting of halide, hydride, unsubstituted $C_1$–$C_{20}$ hydrocarbyl, $C_1$–$C_{20}$ hydrocarbyl substituted with at least one $R^1$ group as defined under (a)–(i) above, alkoxide, aryloxide, amide, halide or phosphide; or ii) together, $Q^1$ and $Q^2$ may form an alkylidene, cyclometallated hydrocarbyl or any other divalent anionic chelating ligand.

Such compounds can also include an $L_w$ complexed thereto wherein L is a neutral Lewis base such as diethylether, tetrahydrofuran, dimethylaniline, aniline, trimethylphosphine, n-butylamine, and the like; and "w" is a number from 0 to 3.

The term "cyclopentadienyl" refers to a 5-member ring having delocalized bonding within the ring and typically being bound to M through $\eta^5$-bonds, carbon typically making up the majority of the 5-member positions.

Examples of the bridged, bis(cyclopentadienyl) zirconium compounds of the invention include:

dimethylsilanyl(cyclopentadienyl) (trimethylcyclopentadienyl) zirconium dichloride, dimethylsilanyl(cyclopentadienyl) (trimethylcyclopentadienyl) zirconium dimethyl, dimethylsilanyl(cyclopentadienyl) (trimethylcyclopentadienyl) zirconium dibenzyl, diphenylsilanyl(cyclopentadienyl) (trimethylcyclopentadienyl) zirconium dichloride, diphenylsilanyl(cyclopentadienyl) (trimethylcyclopentadienyl) zirconium dimethyl, diphenylsilanyl(cyclopentadienyl) (trimethylcyclopentadienyl) zirconium dibenzyl, diphenylmethylene(cyclopentadienyl) (trimethylcyclopentadienyl) zirconium dichloride, methylphenylmethylene(cyclopentadienyl)(trimethylcyclopentadienyl) zirconium dimethyl, diphenylmethylene(cyclopentadienyl)
(trimethylcyclopentadienyl) zirconium dibenzyl,
silacyclobutyl(cyclopentadienyl)
(trimethylcyclopentadienyl) zirconium dichloride,
silacyclobutyl(cyclopentadienyl)
(trimethylcyclopentadienyl) zirconium dimethyl,
silacyclobutyl(cyclopentadienyl)
(trimethylcyclopentadienyl) zirconium dibenzyl,
isopropylidene(cyclopentadienyl)
(trimethylcyclopentadienyl) zirconium dichloride,
isopropylidene(cyclopentadienyl)
(trimethylcyclopentadienyl) zirconium dimethyl,
isopropylidene(cyclopentadienyl)
(trimethylcyclopentadienyl) zirconium dibenzyl,
dimethylsilanyl(cyclopentadienyl)
(tetramethylcyclopentadienyl) zirconium dichloride,
dimethylsilanyl(cyclopentadienyl)
(tetramethylcyclopentadienyl) zirconium dimethyl,
dimethylsilanyl(cyclopentadienyl)
(tetramethylcyclopentadienyl) zirconium dibenzyl,
diphenylsilanyl(cyclopentadienyl)
(tetramethylcyclopentadienyl) zirconium dichloride,
diphenylsilanyl(cyclopentadienyl)
(tetramethylcyclopentadienyl) zirconium dimethyl,
diphenylsilanyl(cyclopentadienyl)
(tetramethylcyclopentadienyl) zirconium dibenzyl,
diphenylmethylene(cyclopentadienyl)
(tetramethylcyclopentadienyl) zirconium dichloride,
methylphenylmethylene(cyclopentadienyl)
(tetramethylcyclopentadienyl) zirconium dimethyl,
diphenylmethylene(cyclopentadienyl)
(tetramethylcyclopentadienyl) zirconium dibenzyl,
silacyclobutyl(cyclopentadienyl)
(tetramethylcyclopentadienyl) zirconium dichloride,
silacyclobutyl(cyclopentadienyl)
(tetramethylcyclopentadienyl) zirconium dimethyl,
silacyclobutyl(cyclopentadienyl)
(tetramethylcyclopentadienyl) zirconium dibenzyl,
isopropylidene(cyclopentadienyl)
(tetramethylcyclopentadienyl) zirconium dichloride,
isopropylidene(cyclopentadienyl)
(tetramethylcyclopentadienyl) zirconium dimethyl,
isopropylidene(cyclopentadienyl)
(tetramethylcyclopentadienyl) zirconium dibenzyl.

Substituted versions where a hydride, hydrocarbyl, germyl or silyl group replaces one or both chloride ligands of M are suitable in accordance with invention particularly where ionizing anion precursors are activators. Separate or in situ alkylation is typical, e.g., dimethyl replacing dichloride.

A preferred catalyst according to the invention will be those in which $Cp^2$ is tri- or tetra-alkyl substituted with methyl, ethyl, isopropyl or tertiary butyl alkyl groups, or mixed combinations of two or more such alkyl groups. Preferred bridging groups, those particularly suited for increased activity and increased molecular weights, are both silacyclic and aryl-group containing methylene groups, e.g., silacyclobutyl, methylphenylmethylene and diphenylmethylene.

The bridged, bis(cyclopentadienyl) zirconium compounds according to the invention may be activated for olefin polymerization catalysis in any manner sufficient both to remove or complex one Q group such that the metal center becomes sufficiently electron deficient to attract olefinically unsaturated monomers and such that the other Q bond is either itself, or is abstracted and substituted with another Q bond, sufficiently weak so as to permit insertion of it into the olefinically unsaturated monomer to yield a growing polymer, in the manner of traditional coordination/insertion polymerization. The traditional activators of metallocene polymerization art are suitable, those typically include Lewis acids such as aluminum alkyls or alumoxane compounds, and ionizing anion pre-cursors that abstract one Q so as ionize the metal center into a cation and provide a counter-balancing noncoordinating anion.

The term "noncoordinating anion" means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a+1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by ionizing anion pre-cursors appear in the early work in EP-A-0 277 003, EP-A-0 277 004, U.S. Pat. Nos. 5,198,401 and 5,278,119, and WO92/00333. These teach a preferred method of preparation wherein metallocene compounds are protonated by an anionic precursors such that an alkyl/hydride group is abstracted from a transition metal to make it both cationic and charge-balanced by the non-coordinating anion. The use of ionizing ionic compounds not containing an active proton but capable of producing the both the active metallocene cation and an noncoordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated by reference for purposes of U.S. patent practice.

An additional method of making the ionic catalysts uses ionizing anion precursors which are initially neutral Lewis acids but form the cation and anion upon ionizing reaction with the metallocene compounds, for example tris (pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

Examples of suitable anion precursors capable of ionic cationization of the metallocene compounds of the invention, and consequent stabilization with a resulting noncoordinating anion include trialkyl-substituted ammonium salts such as are well-known in the art, see U.S. Pat. No. 5,198,401 and WO-A-96/33227, and others above.

Further examples of suitable anion precursors include those comprising a stable carbonium ion, and a compatible non-coordinating anion. These include:

tropillium tetrakispentafluorophenyl borate,
triphenylmethylium tetrakispentafluorophenyl borate,
benzene(diazonium)tetrakispentafluorophenyl borate,
tropillium phenyltris-pentafluorophenyl borate,
triphenylmethylium phenyl-trispentafluorophenyl borate,
benzene(diazonium)phenyltrispentafluorophenyl borate,
tropillium tetrakis(2,3,5,6-tetrafluorophenyl)borate,
triphenylmethylium tetrakis (2,3,5,6-tetrafluorophenyl) borate,
benzene (diazonium)tetrakis(3,4,5-trifluorophenyl) borate,
tropillium tetrakis (3,4,5-trifluorophenyl)borate,
benzene (diazonium)tetrakis(3,4,5-trifluorophenyl) borate,
tropillium tetrakis(3,4,5-trifluorophenyl)aluminate,
triphenylmethylium tetrakis(3,4,5-trifluorophenyl) aluminate,
benzene (diazonium)tetrakis (3,4,5-trifluorophenyl) aluminate,
tropillinum tetrakis(1,2,2-trifluoroethenyl)borate,
triphenylmethylium tetrakis(1,2,2-trifluoroethenyl) borate,
benzene (diazonium) tetrakis(1,2,2-trifluoroethenyl) borate, tropillium tetrakis (2,3,4,5-tetrafluorophenyl) borate,
triphenylmethylium tetrakis(2,3,4,5-tetrafluorophenyl) borate,
benzene (diazonium) tetrakis(2,3,4,5-tetrafluorophenyl) borate,
and, diethylanilinium n-butyltris(pentafluorophenyl)borate.

Where the metal ligands include Q halide moieties, such as in (cyclopentadienyl)dimethylsilyl (tetramethylcyclopentadienyl) zirconium dichloride, which are not capable of discrete ionizing abstraction under standard conditions, these moieties can be converted via known alkylation reactions with organometallic compounds such as lithium or aluminum hydrides or alkyls, alkylalumoxanes, Grignard reagents, etc. See EP-A-0 500 944, EP-A-1-0 570 982 and EP-A1-0 612 769 for processes describing the reaction of alkyl aluminum compounds with dihalide substituted metallocene compounds prior to or with the addition of activating anion precursor compounds.

Known alkylalumoxanes are additionally suitable as catalyst activators, particularly for the invention metal compounds comprising the halide ligands. The alumoxane component useful as catalyst activator typically is an oligomeric aluminum compound represented by the general formula $(R-Al-O)_n$, which is a cyclic compound, or $R(R-Al-O)_nAlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

When using ionic catalysts comprising bridged Group 4 metal cations and non-coordinating anions, the total catalyst composition will generally additionally comprise one or more scavenging compounds. The term "scavenging compounds" as used in this application and its claims is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when a metallocene cation-noncoordinating anion pair is the catalyst composition. The polar impurities, or catalyst poisons include water, oxygen, metal. impurities, etc. Preferably steps are taken before provision of such into the reaction vessel, for example by chemical treatment or careful separation techniques after or during the synthesis or preparation of the various components, but some minor amounts of scavenging compound will still normally be required in the polymerization process itself. Typically the scavenging compounds will be an organometallic compound such as the Group-13 organometallic compounds of U.S. Pat. Nos. 5,153,157, 5,241,025, EP-A-0 426 638 and WO-A-91/09882 and WO-A-94/03506, noted above, and those of WO-A-93/14132 and WO-A-97/22635. Exemplary compounds include triethyl aluminum, triethyl borane, tri-isobutyl aluminum, methyl alumoxane, isobutyl aluminumoxane, and tri-n-octyl aluminum, those having bulky or $C_6$ or higher linear substituents covalently bound to the metal or metalloid center being preferred to minimize adverse interaction with the active catalyst. When an alkyl aluminum or alumoxane is used as activator, any excess over the amount of metallocene present will act as scavenger compounds and additional scavenging compounds may not be necessary. The amount of scavenging agent to be used with metallocene cation-noncoordinating anion pairs is minimized during polymerization reactions to that amount effective to enhance activity. In the process described in this invention, it was found that there is an optimum contact time between the scavenger compound and the reaction mixture to maximize catalyst activity. If the contact time is too long, detrimental catalyst deactivation might occur. All documents are incorporated by reference.

The solution process for the production of the EPC elastomers in accordance with this invention improves process economics and increases product capabilities. For process economics, the combination of high catalyst activity and solvent recovery systems brings significant cost improvements. The improved economics of the high catalyst activity solution process compared with the conventional process is related to savings in the finishing area by not requiring catalyst deashing facilities. In addition, efficient solvent recycling also reduces the environmental impact of the process with respect to volatile organic compound emissions to meet increasingly more restrictive regulatory levels. Additionally, the use of the invention process allows for high diolefin conversion from monomer to incorporated mer unit in the polymer, thus reducing cost of separation and recycle. Typical conversion ratios of diolefin monomer can range from 20%, 30% or up to as high as 40%, and higher.

The polymerization process of the invention involves contacting the polymerizable monomers (ethylene, α-olefin and, diene monomer) in solution with the described ionic catalyst composition, preferably at high reaction temperatures, from about 20° C. to 180° C., and can be suitably conducted in the following manner. The solvent is heated to reaction temperature prior to introduction into the reaction vessel. The solvent is then provided to the reaction vessel after polymerizable monomer is introduced in either liquid, gas or solution form into that reaction solvent. A reaction medium is formed comprising the solvent within which the catalyst composition and monomers are contacted for the polymerization reaction. Typically, the scavenging compound is introduced into the reaction solvent to reduce or eliminate catalyst poisons present in any of the reaction medium components prior to introduction into the reactor. If the scavenging compound and activator are different, and contacted with each other for sufficient time, adverse effects on the effectiveness of that activator might occur. In this process, the activator and metallocene compound are contacted in the polymerization reaction vessel in the presence of the polymerizable monomers, comprising the in-situ activation.

A suitable solution reaction can be conducted at pressures from atmospheric to 500 psig (1–35 bar), preferably from 100 to 300 psig (8 to 21 bar). Preferred reaction temperatures are above 30° C., preferably up to and above about 80° C. Typically the polymerization reaction will be exothermic and the reactor or reactor feeds will be chilled or cooled in accordance with known methods to assure that temperatures do not exceed those reasonably suitable for the polymer being produced. Another preferred process in which any of the catalyst, cocatalyst and scavenger selections disclosed in this application can be advantageously practiced is that of a continuous, solution process operated at or above 90° C. to 200° C., preferably above 110° C. Typically this process is conducted in an inert hydrocarbon solvent, linear, cyclic or branched aliphatic, or aromatic, at a pressure of from 20 to 200 bar, the reactants being added directly into a suitable reaction vessel containing the solvent at preferred operating temperatures.

An additionally suitable homogeneous process of polymerization is that conducted at high pressure, that is at from 200 to 3000 bar, preferably from 500 to 2500 bar in a homogeneous single phase or two fluid phases, with or without unreactive diluents or solvents at temperatures generally above the melting point of the polymer being produced. Such processes are typically known and may include the use of scavenger compounds and catalyst deactivation or killing steps, see for example U.S. Pat. No. 5,408,017, WO 95/07941, WO 92/14766, and WO 97/22635. Each of these documents and their U.S. counterparts are incorporated by reference for purposes of U.S. patent practice. Preferred catalyst deactivators, or killers, include high molecular weight, non-recyclable compounds, such as poly vinyl alcohol which exhibit the functional capacity to complex with the catalysts so as to deactivate them while not forming volatile polar by-products or residual unreacted compounds.

The feedstock purification prior to introduction into the reaction solvent follows standard practices in the art, e.g. molecular sieves, alumina beds and oxygen removal catalysts are used for the purification of ethylene, α-olefin, and optional diene. The solvent itself as well, e.g., hexane and toluene, are similarly treated. Purification of the dienes was observed to increase diene conversion, best results were obtained when the diene was fractionally distilled with $CaH_2$ as the purification method.

The α-olefin monomer(s) and diene monomer(s) are introduced in an amount proportional to the levels of incorporation desired for the polymer to be produced and the effective reactive ratios for the polymerizable monomers in the presence of the specific catalyst chosen. In the preferred embodiment the combination of the α-olefin monomer(s) in reaction solvent as introduced into the reactor and effective vapor pressure of α-olefin monomer(s) is maintained according to the rate of incorporation into the copolymer product. In an alternative embodiment, the partial pressure in the reactor will be provided by ethylene alone in which situation the α-olefin monomer(s) are added solely with reaction solvent. The amounts and vapor pressure will vary according to catalyst selection and polymer to be produced, but can be empirically determined well within the skill in the art, particularly in view of the description provided in the following examples.

The catalyst activator, e.g., non-coordinating anion precursor, ionizing anionic precursor, or alumoxane, can be introduced along with or separately from introduction of the optional diolefin monomer(s), if used. The diolefin can be provided in an amount effective for its rate of reaction and rate of conversion. The catalyst activator can be provided in an amount that is equal to 0.2 to 10 molar equivalents of the Group 4 metallocene compound, preferably 0.25 to 5, and even more preferably 0.33 to 3.0, when a noncoordinating anion precursor. Typically the provision of the noncoordinating anion precursor activator will be in an effective solvent, typically an aromatic solvent such as toluene. Monitoring of polymerization activity by known methods will permit on-line adjustment of alumoxane to assure neither excess nor deficit amounts are maintained for unwanted periods.

The scavenging compounds are provided separately afterwards or with one of the foregoing feedstreams, in an amount suitable to increase the activity of the catalyst but in an amount lower than that at which depression of reactivity is observed. Typically an effective amount of the scavenging compound is about 0 (e.g., with an alumoxane activator) to 100 mol. ratio based upon the ratio of scavenging compound to activator, preferably the ratio is 0.3 to 30, and most preferably it is 0.5 to 10.

Ethylene gas is then provided into the reaction vessel in an amount proportional to, the level of incorporation desired and the effective reactive ratios for the polymerizable monomers in the presence of the specific catalyst chosen, as with the α-olefin monomer(s). The polymerization starts upon contact of the monomers with the activated catalyst and the rates of supply of each of the components of the composition are adjusted for stable operations at the level of production, molecular weight, monomer incorporation and equipment limitations. The reaction temperature may be permitted to exceed the initial temperature but will preferably be at all times greater than the lower limit of the ranges described above for the invention process.

The solvents for the polymerization reaction will comprise those known for solution polymerization, typically the aliphatic solvents represented by hexane, or the aromatic solvents, represented by toluene. Additional examples include heptane, cyclohexane, and Isopar E ($C_8$ to $C_{12}$ aliphatic solvent, Exxon Chemical Co., U.S.). Preferably the solvent is aliphatic, most preferably it is hexane.

Though not strictly necessary for the solution polymerization process as described, the catalyst according to the invention may be supported for use in alternative gas phase, bulk, or slurry polymerization processes where the high activity benefits of the catalysts are sought to be applied. Numerous methods of support are known in the art for copolymerization processes for olefins, particularly for catalysts activated by alumoxanes, any is suitable for the invention process in its broadest scope. See, for example, U.S. Pat.

No. 5,227,440. An example of supported ionic catalysts appears in WO 94/03056. When using a Lewis acid ionizing catalyst activator a particularly effective method is that described in U.S. Pat. No. 5,643,847. A bulk, or slurry, process utilizing supported, biscyclopentadienyl Group 4 metallocenes activated with alumoxane co-catalysts is described as suitable for EPM and EPDM in U.S. Pat. Nos. 5,001,205 and 5,229,478, these processes will additionally be suitable with the catalyst compositions of this application. Each of the foregoing documents is incorporated by reference for purposes of U.S. patent practice.

Though the Examples and the discussion are directed to a single reactor configuration and narrow polydispersity polymers, it is well-known that the use in series of two such reactors each operated so as to achieve different polymer molecular weight characteristics, or by blending polymers from different reactor conditions or utilizing two or more different transition metal catalysts in one or more reactors, can yield improved processing polymers. The disclosures of U.S. Pat. No. 4,722,971 and WO 93/21270 are instructive and are incorporated for purposes of U.S. patent practice. Though directed to the use of vanadium catalysts, the substitution of the catalyst compositions of this invention into one such reactor, or two different invention catalysts into two such reactors, or similar use in two separate polymerizations with subsequent physical blending of the polymer products, will permit tailoring of characteristics (e.g., molecular weights and diene contents) suitable for balancing vulcanization properties with processability. Similarly, the use of mixed catalyst compositions, the invention catalysts with themselves or with others, in one or more such reactors will permit preparation of bimodal or multimodal EPC polymers having improved processing properties.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. Methods of determining $M_n$ and monomer contents by NMR and GPC for the illustrative EPDM examples of the invention are described in U.S. Pat. No. 5,229,478 which is incorporated by reference for purposes of U.S. patent practice. For measurement of comonomer contents in the EPC elastomers, the method of ASTM D3900 for ethylene-propylene copolymers between 35 and 85 wt. % ethylene was used. Outside that range the NMR method was used. See also, U.S. Pat. No. 4,786,697 which is incorporated by reference for purposes of U.S. patent practice.

EXAMPLES

Example 1

Synthesis of EPDM

The polymerizations were conducted in a 500 cc autoclave reactor operated at the temperature of 115° C. in the batch mode for the polymer and semi-batch for the ethylene monomer. The following procedure was used for the polymerizations:

The reactor was charged with 250 cc of purified hexane, 5 cc of 10 wt. % toluene solution of MAO (activator) and 3 cc of purified ENB (fractional distillation with $CaH_2$).

The reactor was heated to 115° C., resulting in a hexane vapor pressure of approximately 37 psig (2.5 bar).

Propylene was added to the reactor to reach 110 psig (7.48 bar) pressure (liquid phase molar conc.=0.856M).

Ethylene was added to the reactor to reach 235 psig (16 bar) pressure (liquid phase conc.=0.871M ) These conditions determined the initial ethylene/propylene molar ratio equal to 1.018. The ethylene/ENB molar ratio was 10.43.

The catalyst solution was pumped to the reactor to maintain the polymerization rate constant as indicated by the make-up flow rate of ethylene to the reactor. The pumping was adjusted to keep this rate at about 0.1 SLPM (standard L/min, standard conditions 1 bar, 21.1° C.), to target approximately 10 g yield of polymer.

Irganox® 1076 was added to the hexane solution to the final concentration of 0.1 mg/cc to prevent sample degradation. The polymers were worked-up from the solution by precipitation with IPA. After filtering and removing free solvents, the polymer samples were dried under vacuum at 90° C. for about 1 hour.

The analysis of the polymers were done by $^1$H-NMR for ENB content and GPC for EPDM molecular weight.

TABLE 1

| Results for Example 1 | |
|---|---|
| Catalyst: | dimethylsilanyl(tetramethylcyclopentadienyl)-(cyclopentadienyl) zirconium dichloride |
| Activator: | methylalumoxane |
| Temperature: | 115° C. |
| Pressure: | 235 psig |

| Polymer Yield (g) | Catalyst Usage (mg) | Ethylene % wt | Propylene % wt | ENB % wt | $M_n$ | PD (MWD) |
|---|---|---|---|---|---|---|
| 9.77 | 0.06 | 90.77 | 4.11 | 3.35 | 25,974 | 2.22 |
| 13.44 | 0.02 | 87.47 | 4.12 | 6.79 | 36,812 | 1.74 |

The catalyst efficiency for these two examples were 162.8 and 670 kg-polymer/g-transition metal, respectively.

Example 2

Synthesis of EPDM

The same procedure as described in Example 1 was carried out with the noncoordinating anion activator and with the following differences:

At room temperature, after the reactor was charged with 200 cc of hexane, 50 cc of the $1.5 \times 10^{-3}$ M of the activator solution in toluene was added. The reactor was then heated up to 115° C., as in Example 1.

To the pressurized reactor after the addition of ethylene, 10 microliters of 2M TIBAL solution in pentane was added as the scavenger at least one minute before the start of the catalyst pumping.

TABLE 2

| Results for Example 2 | |
|---|---|
| Catalyst: | isopropylidene(cyclopentadienyl)(fluorenyl) zirconium dimethyl |
| Activator: | dimethylanilinium tetra (pentafluorophenyl) borate |
| Temperature: | 115° C. |
| Pressure: | 235 psig |

| Polymer Yield (g) | Catalyst Usage (mg) | Ethylene % wt | Propylene % wt | ENB % wt | $M_n$ | PD (MWD) |
|---|---|---|---|---|---|---|
| 14.6 | 0.1 | 77 | 14.55 | 8.45 | 80,498 | 1.65 |

The catalyst efficiency in this example was 146 kg-polymer/g-transition metal.

Example 3 (Comparative)

Synthesis of EPDM

The same procedure as described in Example 2 was carried out with the following catalysts:

TABLE 3

Results for Comparative Example 2

| Catalyst: | (see catalyst code following table) |
| Activator: | (see catalyst code following table) |
| Temperature: | 115° C. |
| Pressure: | 235 psig |

| Catalyst | Polymer Yield (g) | Catalyst Usage (mg) | Catalyst Efficiency (kg/g)* | Ethylene % wt | Propylene % wt | ENB % wt | $M_n$ | PD |
|---|---|---|---|---|---|---|---|---|
| C-1 | 12.8 | 0.4 | 32 | 51.74 | 33.27 | 8.15 | 79,213 | 1.98 |
| C-1 | 7.61 | 0.6 | 12.68 | 55.34 | 29.24 | 9.06 | 93,442 | 1.73 |
| C-2 | 13 | 0.12 | 108.33 | 68.42 | 29.09 | 2.49 | 76,741 | 2.04 |
| C-3 | 6.5 | 0.01 | 650 | 95.94 | 2.39 | 0.54 | 54,239 | 2.14 |
| C-4 | 14.12 | 1.33 | 10.62 | 86.77 | 10.52 | 2.71 | 19,314 | 10.27 |
| C-4 | 6.59 | 0.67 | 9.84 | 85.21 | 11.64 | 3.15 | 15,853 | 12.17 |
| C-5 | 9.4 | 0.5 | 18.8 | 85.14 | 11.71 | 3.15 | 67,723 | 2.01 |
| C-5 | 9.05 | 0.3 | 30.17 | 85.43 | 11.2 | 3.37 | 74,125 | 1.87 |
| C-6 | 7.39 | 1.8 | 4.11 | 77.65 | 9.57 | 9.66 | 32,559 | 1.82 |
| C-6 | 7.96 | 1 | 7.96 | 76.04 | 10.73 | 9.84 | 34,066 | 1.72 |

*kg-polymer product per g-transition metal in catalyst

C-1: dimethylsilanyl(tetramethylcyclopentadienyl) (cycododecylamido) titanium dichloride/methylalumoxane C-2: dimethylsilanyl(tetramethylcyclopentadienyl) (admantylamido) titanium dimethyl/dimethylanilinium tetrakis(pentafluorophenyl)borate C-3: (pentamethylcyclopentadienyl)(cyclopentadienyl) zirconium dimethyl/dimethylanilinium tetrakis (pentafluorophenyl)borate C-4: dimethylsilanyl(2,4-dimethylcyclopentadienyl) (fluorenyl) zirconium dichloride/methylalumoxane C-5 dimethylsilanyl(3-n-propylcyclopentadienyl)(fluorenyl) titanium dichloride/methylalumoxane C-6: dimethylsilanyl(bis)(indenyl) zirconium dimethyl/dimethylanilinium tetrakis (pentafluorophenyl) borate Comparative Example 3 illustrates that only the polymerization with catalyst C-3 exhibited the high activity observed for the catalysts according to the invention. However, the polymer prepared with catalyst C-3 exhibited lower incorporation of comonomers (both propylene and diene monomer) and is accordingly unsuitable in the process according to the invention.

We claim:

1. A process for the preparation of ethylene copolymers comprising contacting under solution polymerization conditions, ethylene,
   one or more α-olefin(s),
   one or more diene(s), and
   a catalyst composition prepared from
   (a) a cocatalyst, and
   (b) at least one bis(cyclopentadienyl) zirconium compound having the following structure:

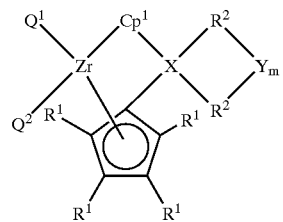

where
(i) the unsubstituted cyclopentadienyl ring is $Cp^1$,
(ii) the substituted cyclopentadienyl ring has at least two non-hydrogen radical substituents, $R^1$, which are radicals independently selected from:
    hydrogen radical,
    unsubstituted hydrocarbyl, silyl or germyl radicals having from 1–20 carbon, silicon or germanium atoms,
    substituted hydrocarbyl, silyl or germyl radicals having from 1–20 carbon, silicon or germanium atoms, in which one or more hydrogen atoms is replaced by a halogen radical, an amido radical, a phosphido radical, an alkoxy radical, an aryloxy radical or any other radical containing a Lewis acidic or basic functionality,
    $C_1$–$C_{20}$-hydrocarbyl-substituted, Ge-, Sn-, or Pb-metalloid radicals,
    halogen radicals,
    amido radicals,
    phosphido radicals,
    alkoxy radicals, and
    alkylborido radicals;
(iii) X is selected from C, Si, Ge, Sn or Pb;
(iv) m=1,
(v) Y is selected from hydrocarbyl radicals, hydrosilyl radicals, and hydrogermyl radicals; and
(vi) $R^2$ is selected from, unsubstituted $C_1$–$C_{20}$ hydrocarbyl, $C_1$–$C_{20}$ hydrocarbyl substituted with at least one Si, or $C_1$–$C_{20}$ hydrocarbyl substituted with at least one Ge;
(vii) $Q^1$ and $Q^2$ and are non-cyclopentadienyl radicals in which,
    independently, each Q is selected from halide, hydride, unsubstituted $C_1$–$C_{20}$ hydrocarbyl, $C_1$–$C_{20}$ hydrocarbyl substituted with at least one $R^1$ group as defined under (ii) above, alkoxide, aryloxide, amide, halide, or phosphide; or
    together, Q1 and Q2 may form an alkylidene, cyclometallated hydrocarbyl, or any other divalent anionic chelating ligand.

2. A process for the preparation of ethylene copolymers comprising contacting under solution polymerization conditions,
ethylene,
one or more α-olefin(s),
one or more diene(s), and
a catalyst composition prepared from
(a) alumoxane, and
(b) at least one bis(cyclopentadienyl) zirconium compound having the following structure:

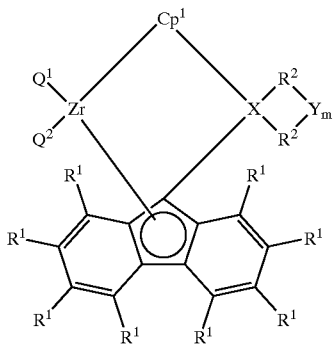

where
(i) $Cp^1$ is an unsubstituted cyclopentadienyl ring,
(ii) the substituted fluorenyl ring has at least two, non-hydrogen radical substituents, $R^1$, independently selected from:
  hydrogen radical,
  unsubstituted hydrocarbyl, silyl, or germyl radicals having from 1–20 carbon, silicon or germanium atoms,
  substituted hydrocarbyl, silyl or germyl radicals having from 1–20 carbon, silicon or germanium atoms, in which one or more hydrogen atoms is replaced by a halogen radical, an amido radical, a phosphido radical, an alkoxy radical, an aryloxy radical or any other radical containing a Lewis acidic or basic functionality,
  $C_1$–$C_{20}$ hydrocarbyl-substituted, Ge-, Sn-, or Pb-metalloid radicals,
  halogen radicals,
  amido radicals,
  phosphido radicals,
  alkoxy radicals, and
  alkylborido radicals;
(iii) X is selected from C, Si, Ge, Sn and Pb;
(iv) m=1,
(v) Y is selected from hydrocarbyl radicals, hydrosilyl radicals, and hydrogermyl radicals; and
(vi) $R^2$ is selected from C1–C20 hydrocarbyl, C1–C20 hydrocarbyl substituted with at least one Si, and C1–C20 hydrocarbyl substituted with at least one Ge;
(vii) Q1 and Q2 are non-cyclopentadienyl radicals in which
  independently, each Q is selected from halide, hydride, unsubstituted $C_1$–$C_{20}$ hydrocarbyl, $C_1$–$C_{20}$ hydrocarbyl substituted with at least one $R^1$ group as defined under (ii) above, alkoxide, aryloxide, amide, halide or phosphide; or
  together, $Q^1$ and $Q^2$ may form an alkylidene, cyclometallated hydrocarbyl or any other divalent anionic chelating ligand.

3. A process for the preparation of ethylene copolymers comprising contacting, under solution polymerization conditions:
a) ethylene,
b) one or more α-olefin(s),
c) one or more diene(s),
d) a catalyst composition prepared essentially from
  (i) silacyclobutyl(tetramethylcyclopentadienyl)(cyclopentadienyl) zirconium dichloride,
  (ii) silacyclobutyl(tetramethylcyclopentadienyl)(cyclopentadienyl) zirconium dimethyl, and
  (iii) a cocatalyst.

4. The process of claim 1, 2, or 3 in which the substituted cyclopentadienyl ring is tri-alkyl or tetra-alkyl substituted with methyl, ethyl, isopropyl, or tertiary-butyl alkyl groups.

5. The process according to claim 4 in which the substituted cyclopentadienyl ring is tetramethylcyclopentadiene, and $XR^2Y_mR^2$ is silacyclobutyl.

6. The process of claim 1, 2, or 3 which the cocatalyst is an alumoxane compound.

7. The process of claim 1, 2, or 3 in which the cocatalyst is an ionizing anion-precursor compound.

8. The process of claim 1, 2, or 3 in which the one or more α-olefin monomer comprises a $C_{3-8}$ α-olefin and the one or more diolefin monomer comprises 5-ethylidene-2-norbornene or 5-vinyl-2-norbornene.

9. The process of claim 1, 2, or 3 in which the one or more α-olefin monomer is propylene and the one or more diene monomer is 5-ethylidene-2-norbornene or 5-vinyl-2-norbornene.

10. A process for the preparation of ethylene copolymers with a density below 0.915 g/ml, comprising contacting under solution polymerization conditions,
ethylene,
one or more α-olefin(s),
optionally one or more diene(s), and
a catalyst composition prepared from
  a cocatalyst, and
  at least one bis(cyclopentadienyl) zirconium compound having the following structure:

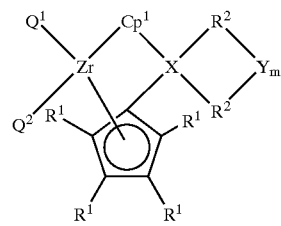

where
(i) $Cp^1$ is an unsubstituted cyclopentadienyl ring,
(ii) the substituted cyclopentadienyl ring has at least two non-hydrogen radical substituents, $R^1$, each independently selected from:
  hydrogen radical,
  unsubstituted hydrocarbyl, silyl or germyl radicals having from 1–20 carbon, silicon, or germanium atoms,
  substituted hydrocarbyl, silyl or germyl radicals having from 1–20 carbon, silicon, or germanium atoms, in which one or more hydrogen atoms is replaced by a halogen radical, an amido radical, a phosphido radical, an alkoxy radical, an aryloxy radical or any other radical containing a Lewis acidic or basic functionality, $C_1$–$C_{20}$ hydrocarbyl-substituted Ge-, Sn-, or Pb-metalloid radicals, halogen radicals, amido radicals, phosphido radicals, alkoxy radicals, and alkylborido radicals;

(iii) X is selected from C, Si, Ge, Sn or Pb;

(iv) m=1, (v) Y is selected from hydrocarbyl radicals, hydrosilyl radicals, and hydrogermyl radicals; and (vi) $R^2$ is selected from unsubstituted $C_1$–$C_{20}$ hydrocarbyl, $C_1$–$C_{20}$ hydrocarbyl substituted with at least one Si, or $C_1$–$C_{20}$ hydrocarbyl substituted with at least one Ge;

(vii) $Q^1$ and $Q^2$ are non-cyclopentadienyl radicals in which, independently, each Q is selected from halide, hydride, unsubstituted $C_1$–$C_{20}$ hydrocarbyl, $C_1$–$C_{20}$ hydrocarbyl substituted with at least one $R^1$ group as defined under (v) above, alkoxide, aryloxide, amide, halide, or phosphide; or together, $Q^1$ and $Q^2$ may form an alkylidene, cyclometallated hydrocarbyl, or any other divalent anionic chelating ligand.

11. A process for the preparation of ethylene copolymers with a density below 0.915 comprising contacting under solution polymerization conditions, ethylene, one or more α-olefin(s), optionally one or more diene(s), and a catalyst composition prepared from (a) alumoxane, and (b) at least one bis(cyclopentadienyl) zirconium compound having the following structure:

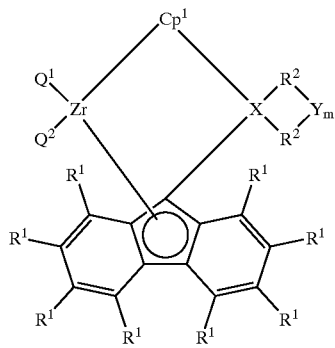

where (i) $Cp^1$ is an unsubstituted cyclopentadienyl ring, (ii) the substituted fluorenyl ring has at least two, non-hydrogen radical substituents, $R^1$, independently selected from:

hydrogen radical, unsubstituted hydrocarbyl, silyl or germyl radicals having from 1–20 carbon, silicon or germanium atoms substituted hydrocarbyl, silyl or germyl radicals having from 1–20 carbon, silicon or germanium atoms, in which one or more hydrogen atoms is replaced by a halogen radical, an amido radical, a phosphido radical, an alkoxy radical, an aryloxy radical or any other radical containing a Lewis acidic or basic functionality, $C_1$–$C_{20}$ hydrocarbyl-substituted Ge-, Sn-, or Pb-metalloid radicals, halogen radicals, amido radicals, phosphido radicals, alkoxy radicals, and alkylborido radicals;

(iii) X is selected from C, Si, Ge, Sn and Pb;

(iv) m=1, (v) Y is selected from hydrocarbyl radicals, hydrosilyl radicals, and hydrogermyl radicals; and (vi) $R_2$ is selected from $C_1$–$C_{20}$ hydrocarbyl, $C_1$–$C_{20}$ hydrocarbyl substituted with at least one Si, and $C_1$–$C_{20}$ hydrocarbyl substituted with at least one Ge;

(vii) $Q^1$ and $Q^2$ are non-cyclopentadienyl radicals in which independently, each Q is selected from halide, hydride, unsubstituted $C_1$–$C_{20}$ hydrocarbyl, $C_1$–$C_{20}$ hydrocarbyl substituted with at least one $R^1$ group as defined under (ii) above, alkoxide, aryloxide, amide, halide or phosphide; or together, $Q^1$ and $Q^2$ may form an alkylidene, cyclometallated hydrocarbyl or any other divalent anionic chelating ligand.

12. A process for the preparation of ethylene copolymers with a density below 0.915 comprising contacting, under solution polymerization conditions:

a) ethylene, b) one or more α-olefin(s), c) optionally one or more diene(s), d) a catalyst composition prepared essentially from (i) silacyclobutyl(tetramethylcyclopentadienyl) (cyclopentadienyl) zirconium dichloride, (ii) silacyclobutyl(tetramethylcyclopentadienyl) (cyclopentadienyl) zirconium dimethyl, and b) a cocatalyst.

13. The process of claim 10, 11, or 12 in which the ethylene polymer has a density below about 0.860 g/cm$^3$.

14. The process of claim 10, 11, or 12 in which the substituted cyclopentadienyl ring is tri-alkyl or tetra-alkyl substituted with methyl, ethyl, isopropyl, or tertiary-butyl alkyl groups.

15. The process according to claim 14 in which the substituted cyclopentadienyl ring is tetramethylcyclopentadiene and $XR^2YmR^2$ is silacyclobutyl.

16. The process of claim 10, 11, or 12 in which the cocatalyst is an alumoxane compound.

17. The process of claim 10, 11, or 12 in which the cocatalyst is an ionizing anion-precursor compound.

18. The process of claim 10, 11, or 12 in which the one or more α-olefin monomer comprises a $C_{3-8}$ α-olefin and the one or more diolefin monomer comprises 5-ethylidene-2-norbornene or 5-vinyl-2-norbornene.

19. The process of claim 10, 11, or 12 in which the one or more α-olefin monomer is propylene and the one or more diene monomer is 5-ethylidene-2-norbornene or 5-vinyl-2-norbornene.

* * * * *